(12) United States Patent
Trank et al.

(10) Patent No.: US 11,863,986 B2
(45) Date of Patent: Jan. 2, 2024

(54) MOBILITY AND ACCESS CONTROL ACROSS TENANT BOUNDARIES IN A MULTITENANT PRIVATE COMMUNICATION SYSTEM

(71) Applicant: MOTOROLA SOLUTIONS, INC., Chicago, IL (US)

(72) Inventors: Chad Trank, Queen Creek, AZ (US); David G. Wiatrowski, Woodstock, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 143 days.

(21) Appl. No.: 17/646,403

(22) Filed: Dec. 29, 2021

(65) Prior Publication Data

US 2023/0209349 A1 Jun. 29, 2023

(51) Int. Cl.
*H04W 12/082* (2021.01)
*H04W 12/086* (2021.01)
(Continued)

(52) U.S. Cl.
CPC ........... *H04W 12/082* (2021.01); *H04W 8/26* (2013.01); *H04W 12/086* (2021.01);
(Continued)

(58) Field of Classification Search
CPC ... H04W 12/082; H04W 12/086; H04W 8/26; H04W 48/02; H04W 76/10; H04W 84/45
(Continued)

(56) References Cited

U.S. PATENT DOCUMENTS 6,493,349 B1   12/2002  Casey
10,142,294 B2  11/2018  Tinnakornsrisuphap et al.
(Continued)

FOREIGN PATENT DOCUMENTS

KR   102069806 B1   1/2020
WO   2017007122 A1  1/2017

OTHER PUBLICATIONS

International Search Report and Written Opinion for Related Application No. PCT/US2022/081204 dated Mar. 24, 2023 (17 pages).

*Primary Examiner* — Nghi H Ly
(74) *Attorney, Agent, or Firm* — Michael Best & Friedrich LLP

(57) ABSTRACT

A multitenant private communication system and a method for providing mobility and access control across tenant boundaries in the multitenant private communication system. The method includes receiving a first connection request from a user device for connection to first network infrastructure of a first tenant and establishing a connection between the user device and a first private sub-network of the first tenant through the first network infrastructure. The method further includes receiving a second connection request from the user device for connection to second network infrastructure of a second tenant of the multitenant private communication system and determining whether the second network infrastructure is a guest network infrastructure of the user device. The method also includes establishing a connection between the user device and the first private sub-network through the second network infrastructure when the second network infrastructure is the guest network infrastructure of the user device.

16 Claims, 7 Drawing Sheets

(51) Int. Cl.
*H04W 8/26* (2009.01)
*H04W 48/02* (2009.01)
*H04W 76/10* (2018.01)
*H04W 84/04* (2009.01)

(52) U.S. Cl.
CPC ............ *H04W 48/02* (2013.01); *H04W 76/10* (2018.02); *H04W 84/045* (2013.01)

(58) Field of Classification Search
USPC ..... 455/411, 410, 435.2, 436, 442, 418, 423
See application file for complete search history.

(56) References Cited

U.S. PATENT DOCUMENTS

| | | | |
|---|---|---|---|
| 10,922,284 B1 * | 2/2021 | Venkatasubramanian | .................. H04L 63/0807 |
| 2011/0137991 A1 * | 6/2011 | Russell | .................. G06Q 10/06 709/204 |
| 2016/0364927 A1 * | 12/2016 | Barry | ...................... G08B 25/10 |
| 2018/0288077 A1 * | 10/2018 | Siddiqui | ................. H04L 63/20 |
| 2019/0313318 A1 * | 10/2019 | Pawar | ................... H04M 15/62 |
| 2020/0037240 A1 | 1/2020 | Hampel et al. | |
| 2021/0352472 A1 | 11/2021 | Ganesan et al. | |

* cited by examiner

MOBILITY AND ACCESS CONTROL ACROSS TENANT BOUNDARIES IN A MULTITENANT PRIVATE COMMUNICATION SYSTEM

BACKGROUND OF THE INVENTION 4G-long term evolution (LTE) and 5G-new radio (NR) standards are capable of supporting a large number of users in a network. Network coverage for 4G-LTE and 5G-NR devices is provided by a network provider. Each network provider is licensed with (or assigned) a public land mobile network (PLMN) identifier (ID) or a home network identifier (HNI). The 3.55 to 3.70 GHz frequency range, often referred to as the citizens broadband radio service (CBRS) band, has recently been opened up for private network. Opening of CBRS frequencies allows entities (for example, police and other first responder agencies, school districts, private organizations, and the like) to setup their own small to medium private communication (for example, 4G-LTE or 5-NR) network.

PLMNIDs are assigned by the USA international mobile subscriber identity (IMSI) administrator. There are a limited number of PLMNIDs available for public use. Therefore, it is impractical for each entity to obtain their own PLMNID for the limited number of users on the entity's network. To address the above issue, network providers lease an assigned PLMNID and related backend infrastructure (for example, evolved packet core (EPC), 5G-core (5GC), and the like) to multiple entities (or tenants). This provides an economical and practical solution for entities to deploy their own private networks.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
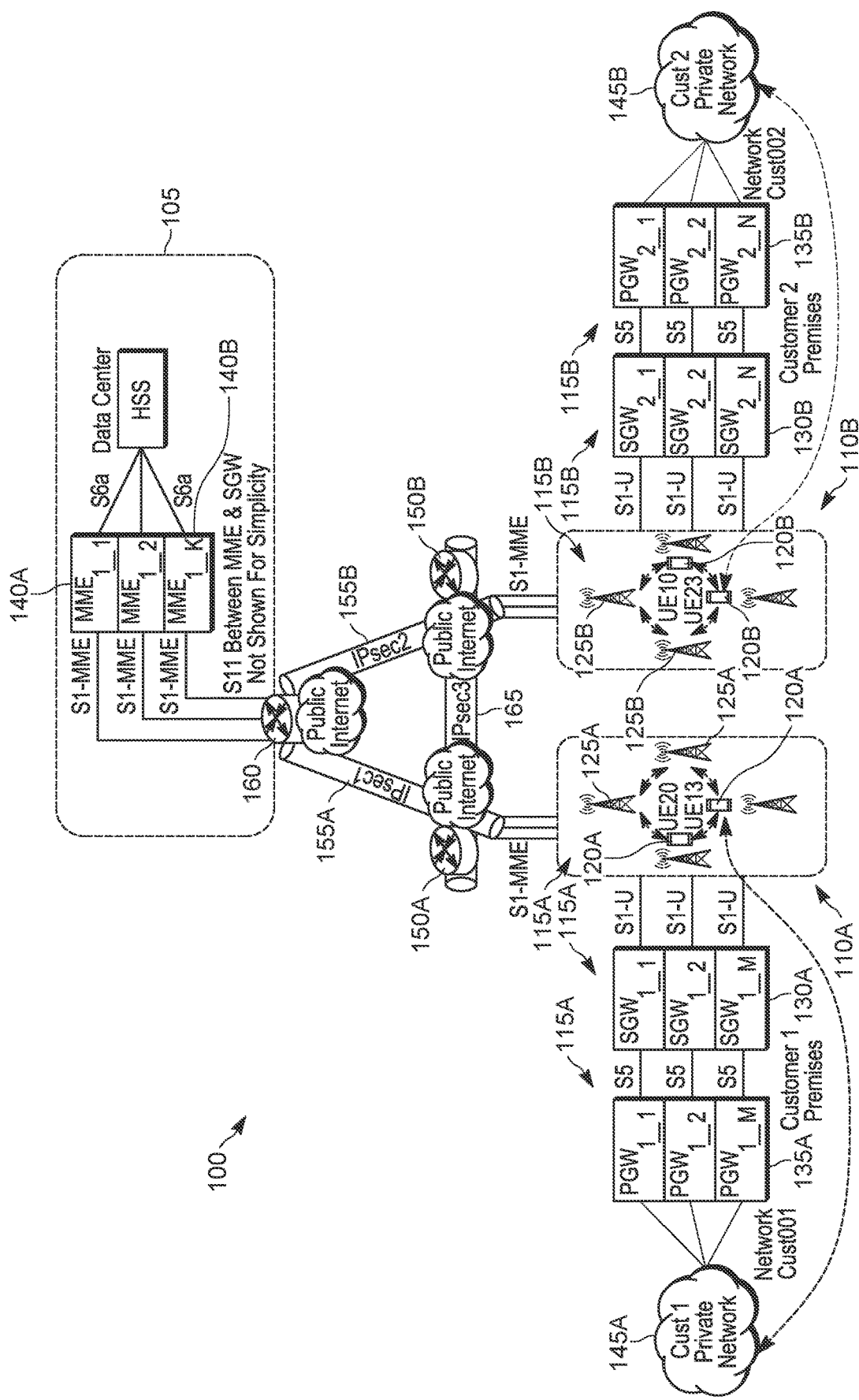
FIG. 1 is a block diagram of a multitenant private communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

Since all tenants across different entities of a network provider use the same PLMNID, additional steps are taken to ensure that independent tenants cannot access other tenants' private networks. For example, each tenant's user-plane data is kept on the tenant's premises. Base stations of each tenant are assigned one or more unique tracking area codes (TACs) such that only user equipment associated with the unique TACs can connect to the particular tenant's network infrastructure (for example, base stations and gateways). That is, user equipment of a first tenant assigned a first TAC cannot connect to the network infrastructure of a second tenant assigned a second TAC. Thus, a single 4G-LTE or 5G-NR network is effectively sub-divided into a plurality of virtual sub-networks with each virtual sub-network assigned to a different tenant.

One problem with the above-noted virtual sub-networks is that mobility of user equipment between related tenants or sharing of networks between related or consenting tenants is prevented. For example, a large corporation or university system having multiple locations or a school district having multiple schools may desire to have their user equipment travel from one location to another location and be able to use a virtual sub-network at each location without reprogramming or swapping SIM cards. Current solutions for handling travel between networks such as roaming and handoff are not applicable in multitenant private communication networks. Roaming is performed when a device travels between different network providers having different PLMNIDs. Handoff occurs when a device travels between a first base station and a second base station.

Accordingly, there is a need for method for mobility and access control across tenant boundaries in a multitenant private communication system.

One embodiment provides a multitenant private communication system including a first tenant including a first network infrastructure, a first private sub-network, and a user device. The first network infrastructure is a resident network infrastructure of the user device and the first private sub-network is private for members of the first tenant. The multitenant private communication system also includes a second tenant including a second network infrastructure, and a data center communicating with the first tenant and the second tenant and including an electronic processor. The electronic processor is configured to receive a first connection request from the user device for connection to the first network infrastructure and establish a connection between the user device and the first private sub-network through the first network infrastructure. The electronic processor is also configured to receive a second connection request from the user device for connection to the second network infrastructure and determine whether the second network infrastructure is a guest network infrastructure of the user device. The electronic processor is further configured to establish a connection between the user device and the first private sub-network through the second network infrastructure when the second network infrastructure is the guest network infrastructure of the user device and reject a connection between the user device and the second network infrastructure when the second network infrastructure is not the guest network infrastructure of the user device.

Another embodiment provides a method for providing mobility and access control across tenant boundaries in a multitenant private communication system. The method includes receiving a first connection request from a user device for connection to first network infrastructure of a first tenant of the multitenant private communication system. The first network infrastructure being a resident network infrastructure of the user device. The method also includes establishing a connection between the user device and a first private sub-network of the first tenant through the first network infrastructure. The first private sub-network is private for members of the first tenant. The method further includes receiving a second connection request from the user device for connection to second network infrastructure of a second tenant of the multitenant private communication system and determining whether the second network infrastructure is a guest network infrastructure of the user device. The method also includes establishing a connection between the user device and the first private sub-network through the second network infrastructure when the second network infrastructure is the guest network infrastructure of the user device and rejecting a connection between the user device and the second network infrastructure when the second network infrastructure is not the guest network infrastructure of the user device.

FIG. 1 is a block diagram of one example of a multitenant private communication system 100. In the example illustrated, the multitenant private communication system 100 includes a data center 105 providing private communication networks to a first tenant 110A and a second tenant 110B. The multitenant private communication system 100 and the data center 105 are operated by a network provider, for example, Motorola Solutions, Inc. and is assigned a PLMNID. The first tenant 110A and the second tenant 110B are, for example, private sub-networks deployed for school districts, public safety organizations, utility companies, private companies, and the like that are implementing a private sub-network specific to the entity. Since the first tenant 110A and the second tenant 110B are sub-networks of the data center 105, the first tenant 110A and the second tenant 110B share the PLMNID of the data center 105. The first tenant 110A and the second tenant 110B are each assigned one or more unique TACs. For example, the first tenant 110A is assigned a first tracking area code and the second tenant 110B is assigned a second tracking area code.

The first tenant 110A includes first network infrastructure 115A and a first plurality of user devices 120A. The first network infrastructure 115A includes one or more first base stations 125A (for example, eNodeBs and/or gNodeBs), a plurality of first serving gateways (SGWs) 130A, and a plurality of first packet data network (PDN) gateways (PGWs) 135A. A first mobility management entity (MME) 140A of the first tenant 110A is provided at the data center 105. The plurality of first SGWs 130A, the plurality of first PGWs 135A, and the first MME 140A form part of the evolved packet core (EPC) of the virtual sub-network of the first tenant 110A. The EPC may include additional components, for example, a home subscriber server (HSS), which are not explicitly mentioned in this disclosure. The first tenant 110A also includes a first private sub-network 145A. The first private sub-network 145A is private to the members (that is, the first plurality of user devices 120A) of the first tenant 110A such that only the first plurality of user devices 120A of the first tenant 110A may use the first private sub-network 145A for network connectivity. User devices 120 that are not members of the first tenant 110A are prevented from accessing the first private sub-network 145A and/or the one or more first base stations 125A. The data center 105 defines a first access point name (APN) for the first private sub-network 145A for accessing the first private sub-network 145A through the plurality of first PGWs 135A. The first APN may be set as the default APN for the first plurality of user devices 120A. The first plurality of user devices 120A achieve network connectivity using the first APN through the first private sub-network 145A.

In the example illustrated, the one or more first SGWs 130A, the one or more first PGWs 135A, and the first private sub-network 145A are illustrated as being provided on the premises of the first tenant 110A and the first MME 140A is illustrated as being provided at the data center 105. However, the one or more first SGWs 130A, the one or more first PGWs 135A, the first MME 140A, and the first private sub-network 145A may be provided at different locations than illustrated and may be collocated or distributed without affecting the methods described herein. For example, the first MME 140A may be provide on the premises of the first tenant 110A. The one or more first SGWs 130A, the one or more first PGWs 135A, and the first private sub-network 145A are unique to the first tenant 110A and are not shared between multiple tenants 110. However, the first MME 140A may be shared across multiple tenants 110. In some embodiments, the first network infrastructure 115A may include more or fewer components than illustrated and described herein. For example, the first network infrastructure 115A may not include the one or more first PGWs 135A.

The second tenant 110B includes second network infrastructure 115B and a second plurality of user devices 120B. The second network infrastructure 115B includes one or more second base stations 125B, a plurality of second SGWs 130B, and a plurality of second PGWs 135B. A second MME 140B of the second tenant 110B is provided at the data center 105. The plurality of second SGWs 130B, the plurality of second PGWs 135B, and the second MME 140B form part of the evolved packet core (EPC) or 5G core (5GC) of the virtual sub-network of the second tenant 110B. The second tenant 110B also includes a second sub-network 145B. The data center 105 defines a second access point name (APN) for the second private sub-network 145B for accessing the second private sub-network 145B through the plurality of second PGWs 135B. The second APN may be set as the default APN for the second plurality of user devices 120B. The second plurality of user devices 120B achieve network connectivity using the second APN through the second private sub-network 145B.

In the example illustrated, the one or more second SGWs 130B, the one or more second PGWs 135B, and the second private sub-network 145B are illustrated as being provided on the premises of the second tenant 110B and the second MME 140B is illustrated as being provided at the data center 105. However, the one or more second SGWs 130B, the one or more second PGWs 135B, the second MME 140B, and the second private sub-network 145B may be provided at different locations than illustrated and may be collocated or distributed without affecting the methods described herein. For example, the second MME 140B may be provided on the premises of the second tenant 110B. The one or more second SGWs 130B, the one or more second PGWs 135B, and the second private sub-network 145B are unique to the second tenant 110B and are not shared between multiple tenants 110. However, the second MME 140B may be shared across multiple tenants 110. For example, a single MME 140 may be provided for both the first tenant 110A and the second tenant 110B. In some embodiments, the second network infrastructure 115B may include more or fewer components that illustrated and described herein. For example, the second network infrastructure 115B may not include the one or more second PGWs 135B. In the present disclosure, the terminology of the components of first network infrastructure 115A is based on the 4G/LTE architecture. Similar components may be referred to with different terminology or some components may be combined in the 5G architecture. For example, MME, SGW, and PGW may be referred to as Access and Mobility Management Function (AMF), Session Management Function (SMF), User Plane Function (UPF), and the like. Even with the different terminology, the present disclosure is equally applicable to both 4G/LTE and 5G networks.

A first router 150A may be used to route data traffic from the first tenant 110A. A first internet protocol security (IPsec) tunnel 155A connects the first router 150A to a data center router 160 of the data center 105. A second router 150B may be used to route data traffic from the second tenant 110B. A second internet protocol security (IPsec) tunnel 155B connects the second router 150B to the data center router 160.

In the example illustrated in FIG. 1, the first tenant 110A and the second tenant 110B have a sharing agreement allowing for sharing of network access between the user devices 120 of the first tenant 110A and the second tenant 110B. A tenant IPsec tunnel 165 is additionally provided connecting the first router 150A and the second router 150B to route data traffic between the first tenant 110A and the second tenant 110B. That is, the tenant IPsec tunnel 165 directly connects the first network infrastructure 115A and the second network infrastructure 115B. The direct connection avoids routing the traffic between the first network infrastructure 115A and the second network infrastructure 115B through the data center 105, the first IPsec tunnel 155A, and/or the second IPsec tunnel 155B. The tenant IPsec tunnel 165 is implemented in many ways, for example, a fiber link, a microwave link, and the like that provide a direct link between the first network infrastructure 115A and the second network infrastructure 115B. In some embodiments, the tenant IPsec tunnel 165 is implemented over the public internet. The tenant IPsec tunnel 165 routes S5 traffic, N2 interface traffic, N3 interface traffic, and the like between the first tenant 110A and the second tenant 110B. In the example shown, the tenant IPsec tunnel 165 connects the plurality of first SGWs 130A to the plurality of second PGWs 135B and connects the plurality of second SGWs 130B to the plurality of first PGWs 135A.

The first tenant 110A and the second tenant 110B may be singularly referred to as a tenant 110. The first network infrastructure 115A and the second network infrastructure 115B may be singularly referred to as network infrastructure 115. The first plurality of user devices 120A and the second plurality of user devices 120B may be singularly referred to as a user device 120. The one or more first base stations 125A and the one or more second base stations 125B may be singularly referred to as a base station 125. The one or more first SGWs 130A and the one or more second SGWs 130B may be singularly referred to as a SGW 130. The one or more first PGWs 135A and the one or more second PGWs 17B may be singularly referred to as a PGW 135. The first MME 140A and the second MME 140B may be singularly referred to as a MME 140.

Tenants 110 typically procure the user devices 120 and assign the user devices 120 to employees or users of the tenants 110. The user devices 120 are then configured to connect to the network infrastructure 115 of the tenants. In the example of FIG. 1, the first plurality of user devices 120A belonging to the first tenant 110A are configured to connect to the first network infrastructure 115A. The first network infrastructure 115A is therefore a resident network infrastructure 115 for the first plurality of user devices 120A. A network infrastructure 115 not part of the first tenant 110A and to which the first plurality of user devices 120A may connect to (for example, based on an sharing agreement) is referred to as a guest network infrastructure 115 for the first plurality of user devices 120A.

Figure 2:
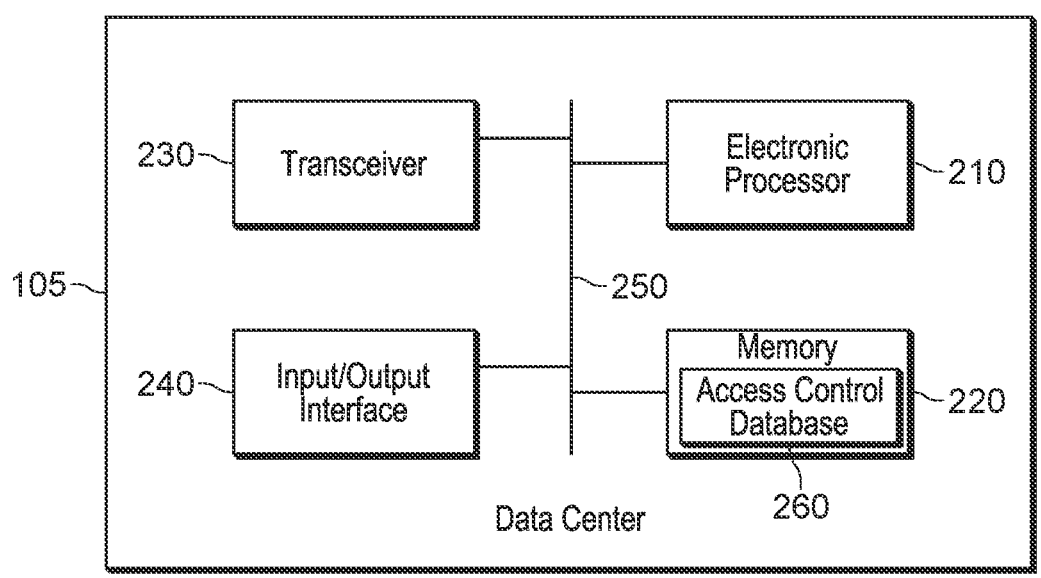
FIG. 2 is a block diagram of a data center of the multitenant private communication system of FIG. 1 in accordance with some embodiments.

FIG. 2 is a block diagram of one example embodiment of the data center 105. In the example illustrated, the data center 105 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one example embodiment of the data center 105. The data center 105 may include more of fewer components and may perform functions other than those explicitly described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), an applications specific integrated circuit (ASIC), an x86 processor, and the like and the memory 220 may not be needed or be modified accordingly. In the example illustrated, the memory 220 includes non-transitory, computer readable memory that stores instructions that are received and executed by the electronic processor 210 to carry out the functionality of the data center 105 described herein. The memory 220 may include, for example, a program storage area and a data storage area. The program storage area and the data storage area may include combinations of different types of memory, such as read-only memory and random-access memory. In some embodiments, the data center 105 includes one electronic processor 210, and/or a plurality of electronic processors 210 in a computer cluster arrangement, one or more of which may be executing none, all, or a portion of the applications of the data center 105. The one or more electronic processor 210 comprising the data center 105 may be geographically co-located or may be separated by inches, meters, kilometers or miles, and interconnected via electronic and/or optical interconnects. One or more proxy servers or load balancing servers may control which one or more electronic processors 210 perform any part or all of the applications provided below.

The transceiver 230 enables wired and/or wireless communication between the data center 105 and the various components of the multitenant private communication system 100. In some embodiments, the transceiver 230 may comprise separate transmitting and receiving components. The input/output interface 240 may include one or more input mechanisms (for example, a touch pad, a keypad, and the like), one or more output mechanisms (for example, a display, a speaker, and the like), or a combination thereof, or a combined input and output mechanism such as a touch screen.

Each user device 120 is assigned a user profile including one or more regional subscriber zone codes (RSZC). The memory stores an access control database 260 that includes a plurality of TACs with each TACs mapped to one or more RSZCs. The access control database 260 may be populated based on sharing agreements between the tenants 110 of the data center 105. A tenant 110 may configure each of its user devices 120 as either "resident only" or "travelling." The access control database 260 will now be explained with the example of FIG. 1 in which the one or more first base stations 125A are assigned the first tracking area code and the one or more second base stations 125B are assigned the second tracking area code and a sharing agreement exists between the first tenant 110A and the second tenant 110B. The first tenant 110A may configure a first subset of the first plurality of user devices 120A as "resident only" and a second subset of the first plurality of user devices 120A as "travelling." Similarly, the second tenant 110B may configure a first subset of the second plurality of user devices 120B as "resident only" and a second subset of the second plurality of user devices 120A as "travelling." A "resident only" user device 120 can connect to the network infrastructure 115 of only the tenant 110 to which the "resident only" user device 120 belongs. A "travelling" user device 120 can connect to the network infrastructure 115 of any tenant 110 in a sharing agreement with the tenant 110 to which the "travelling" user device 120 belongs.

When a connection request is received from a user device 120, an MME 140 of a network infrastructure 115 determines the RSZCs assigned to the TAC of the base station 125 from which the request is received using the access control database 260. The MME 140 then determines whether an RSZC assigned to the TAC of the base station 125 is authorized as either a resident network or a guest network based on the user profile assigned to the user device 120. For example, the MME 140 determines whether the user device 120 is authorized to connect by checking the list of one or more RSZCs in the profile assigned to the user device 120 and comparing the RSZC assigned to the TAC of the base station 125 from which the connection is received. Each tenant 110 may include an administrator account that may mark each of the user devices 120 as noted above. The data center 105 may receive these inputs from the administrator user device 120 and update the access control database 260 accordingly.

In the example illustrated in FIG. 1, the data center 105, the SGWs 130, the PGWs 135, and the MMEs 140 are shown as being separate components. However, the data center 105, the SGWs 130, the PGWs 135 and the MMEs 140 (for example, belonging to EPCs or 5GCs of multiple tenants 110) may be provided as a single component divided between multiple devices and/or locations such that all of the above-noted components may be referred to as the data center 105 and the one or more electronic processors 210 may be distributed across the above-noted components.

Figure 3:
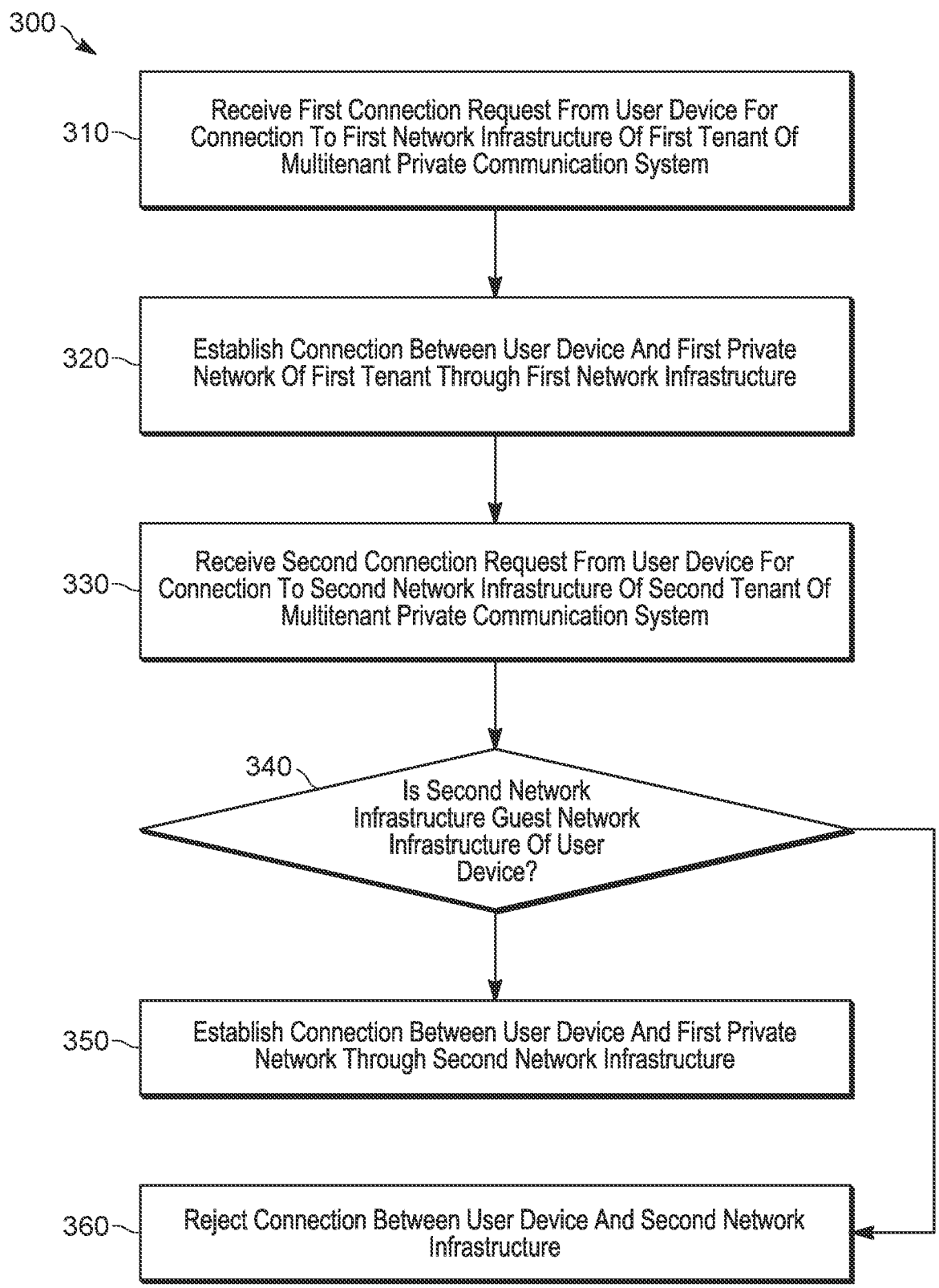
FIG. 3 is a flowchart of a method for providing mobility and access control across tenant boundaries in the multitenant private communication system of FIG. 1 in accordance with some embodiments.

FIG. 3 is a flowchart of an example method 300 for providing mobility and access control across tenant boundaries in the multitenant private communication system 100. The method 300 is explained with respect to FIGS. 4A and 4B which illustrate an example embodiment of the multitenant private communication system 100. In the example illustrated, the method 300 includes receiving a first connection request from a user device 120 for connection to the first network infrastructure 115A of the first tenant 110A of the multitenant private communication system 100 (at block 310). In the example illustrated in FIG. 4A, the first network infrastructure 115A is a resident network infrastructure 115 of the user device 120 and the user device 120 is attempting to access the first private sub-network 145A through the first network infrastructure 115A. User devices 120 are, for example, smart telephones, tablet computers, vehicle computers, internet of things (IoT) devices, and the like that include a subscriber identity module (SIM) card. The SIM card stores a unique international mobile subscriber identity (IMSI), which also includes a home PLMNID, of the user device 120. As discussed above, each network provider (and therefore, the corresponding data center 105) is assigned a unique PLMNID. Each user device 120 that is a customer of the network provider is also provisioned with the same home PLMNID (that is, provisioned in the SIM card of the user device 120). When the home PLMNID of the user device 120 does not match the PLMNID of the data center 105, the connection request may be rejected.

When the home PLMNID of the user device 120 matches the PLMNID of the data center 105, the data center 105 determines whether the first network infrastructure 115A is a resident network infrastructure 115 of the user device 120. One or more base stations 125 within a geographical area (referred to as a tracking area) may be grouped together and assigned a tracking area code (TAC). In one example, the one or more first base stations 125A are grouped together into one or more groups, each group assigned a unique TAC (that is, the first tracking area code of the first tenant 110A). When the one or more first base stations 125A receives a subscriber identity of the user device 120, the one or more first base stations 125A provides the subscriber identity of the user device 120 with the unique TAC (that is, the first tracking area code) of the one or more first base stations 125A to the data center 105. In one example, the data center 105 determines that the first network infrastructure 115A is the resident network infrastructure 115 based on determining that a RSZC mapped to the first TAC in the access control database 260 is authorized as the resident network in the user profile of the user device 120.

Figure 4A:
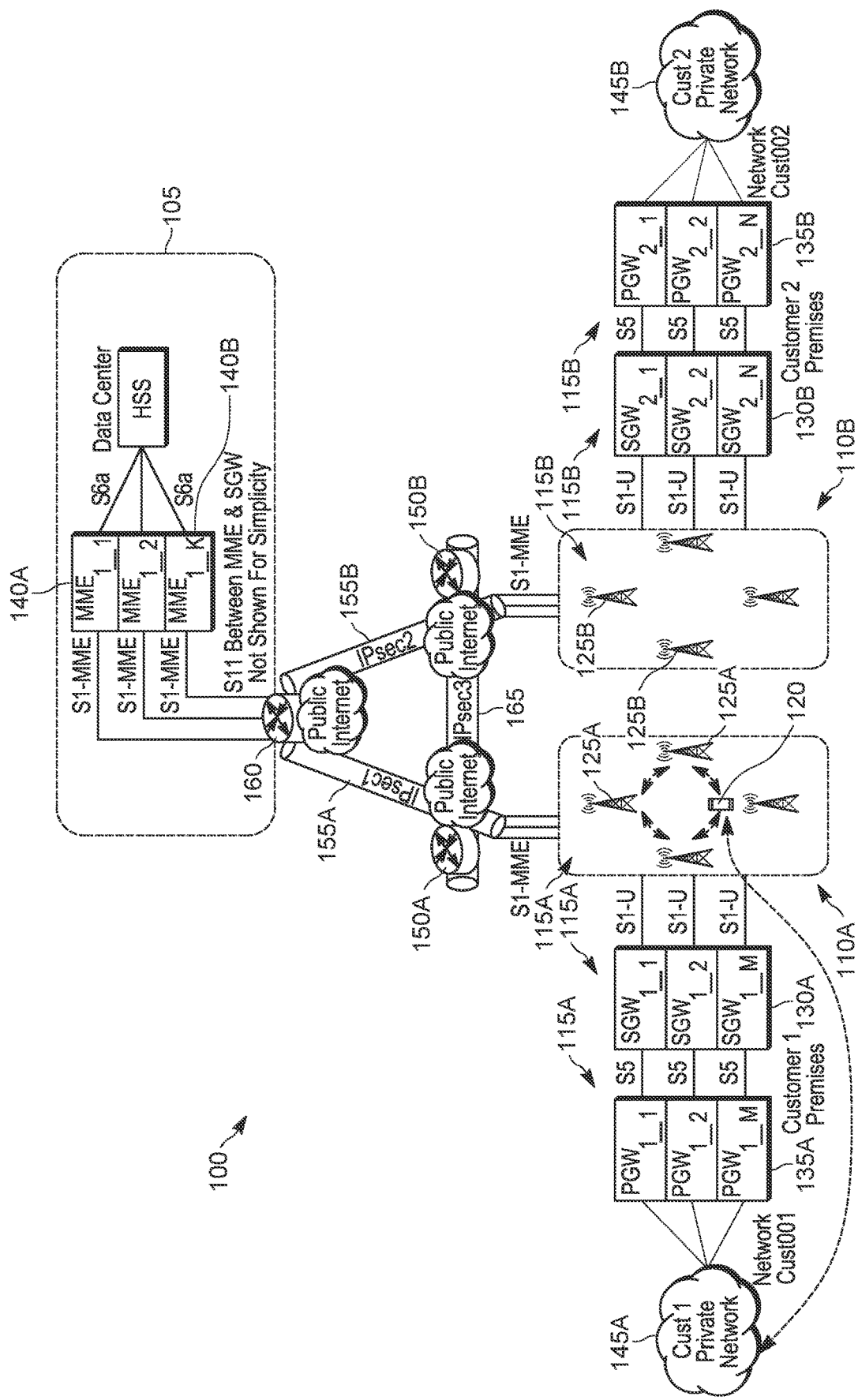
FIGS. 4A and 4B are block diagrams of the multitenant private communication system of FIG. 1 illustrating a mobility scenario in accordance with some embodiments.

When the first network infrastructure 115A is the resident network infrastructure 115 of the user device 120, the method 300 includes establishing a connection between the user device 120 and the first private sub-network 145A of the first tenant 110A through the first network infrastructure 115A (at block 320). When the user device 120 is connected to the first network infrastructure 115A, the user device 120 can access the public Internet and/or data within the first private sub-network 145A using the APN of the first private sub-network 145A through the first network infrastructure 115A as shown in FIG. 4A.

The method 300 includes receiving a second connection request from the user device 120 for connection to the second network infrastructure 115B of the second tenant 110B of the multitenant private communication system 100 (at block 330). As discussed above, sharing agreements between the first tenant 110A and the second tenant 110B may allow some user devices 120 to travel between the first tenant 110A and the second tenant 110B and still access the first private sub-network 145A or the second private sub-network 145B respectively. In the example illustrated in FIG. 4B, the user device 120 has travelled to the second tenant 110B and is attempting to access the first private sub-network 145A through the second network infrastructure 115B.

The method 300 includes determining whether the second network infrastructure 115B is the guest network infrastructure 115 of the user device 120 (at block 340). When the one or more second base stations 125B receives the subscriber identity of the user device 120, the one or more second base stations 125B provides the subscriber identity of the user device 120 with the unique TAC (that is, the second tracking area code) of the one or more first base stations 125A to the data center 105. The data center 105 may determine that the second network infrastructure 115B is the guest network infrastructure 115 based on determining that a RSZC mapped to the second TAC in the access control database 260 is authorized as the guest network in the user profile of the user device 120. That is, the RSZC of the user profile of the user device 120 is mapped to the second TAC. For example, the data center 105 determines whether the user device 120 is part of the second subset of the first plurality of user devices 120A that are marked by the first tenant 110A and "travelling."

Figure 4B:
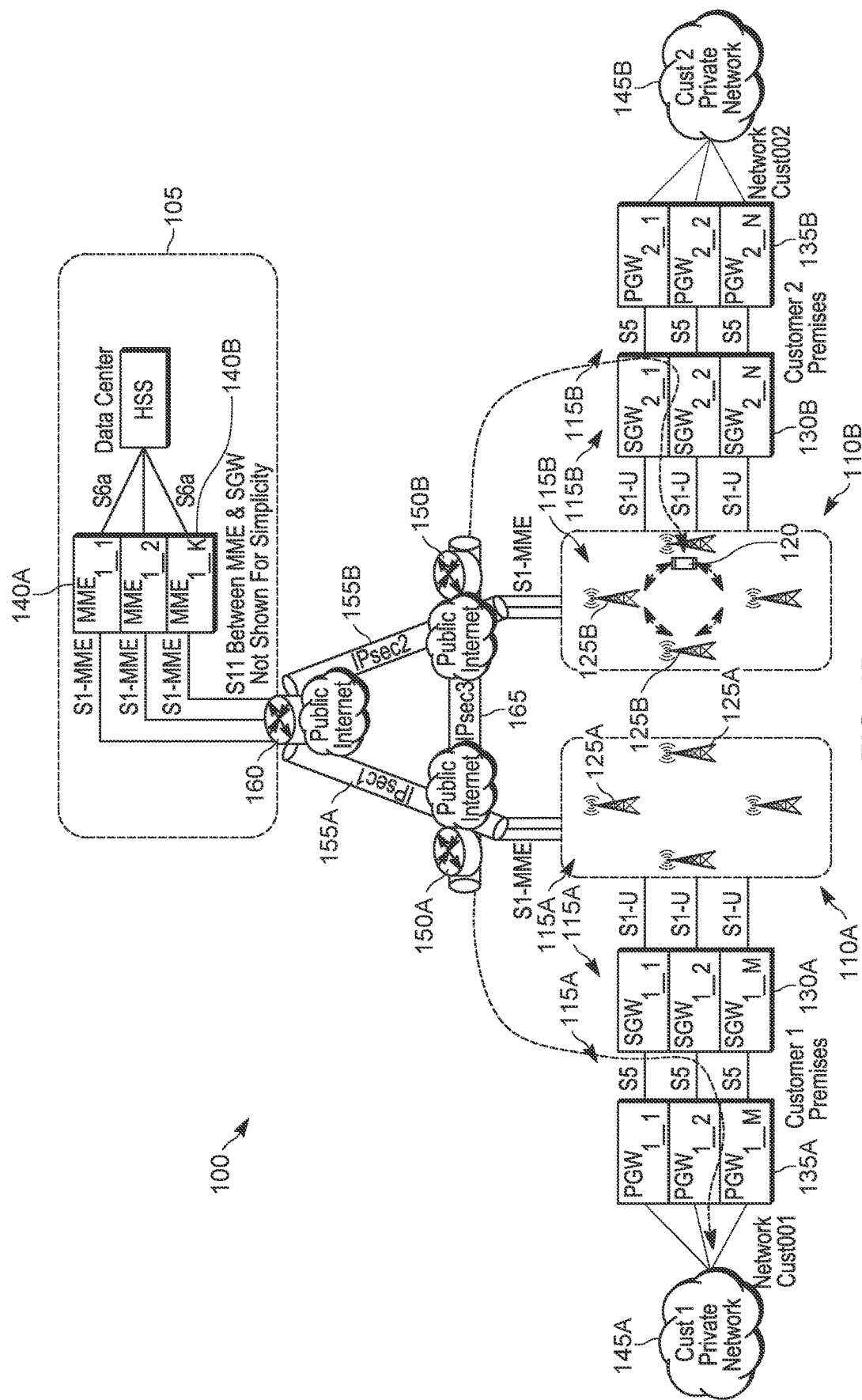

When the second network infrastructure 115B is a guest network infrastructure 115 of the user device 120, the method 300 includes establishing a connection between the user device 120 and the first private sub-network 145A through the second network infrastructure 115B (at block 350). When the user device 120 is connected to the second network infrastructure 115B, the user device 120 can access the public Internet and/or data of the first private sub-network 145A using the APN of the first private sub-network 145A through the second network infrastructure 115B as shown in FIG. 4B. The voice and/or data traffic between the user device 120 and the first private sub-network 145A is routed through the one or more second base stations 125B, the one or more second SGWs 130B, the tenant IPsec tunnel 165, and the one or more first PGWs 135A. When the second network infrastructure 115B is not a guest network infrastructure 115 of the user device 120, the method 300 includes rejecting a connection request between the user device 120 and the second network infrastructure 115B (at block 360). For example, the data center 105 provides a reject cause code to the user device 120 indicating that the PLMNID is correct but the TAC is not authorized. In some examples, the method 300 repeats for each connection attempt between the user device 120 and applicable network infrastructure 115.

Figure 5:
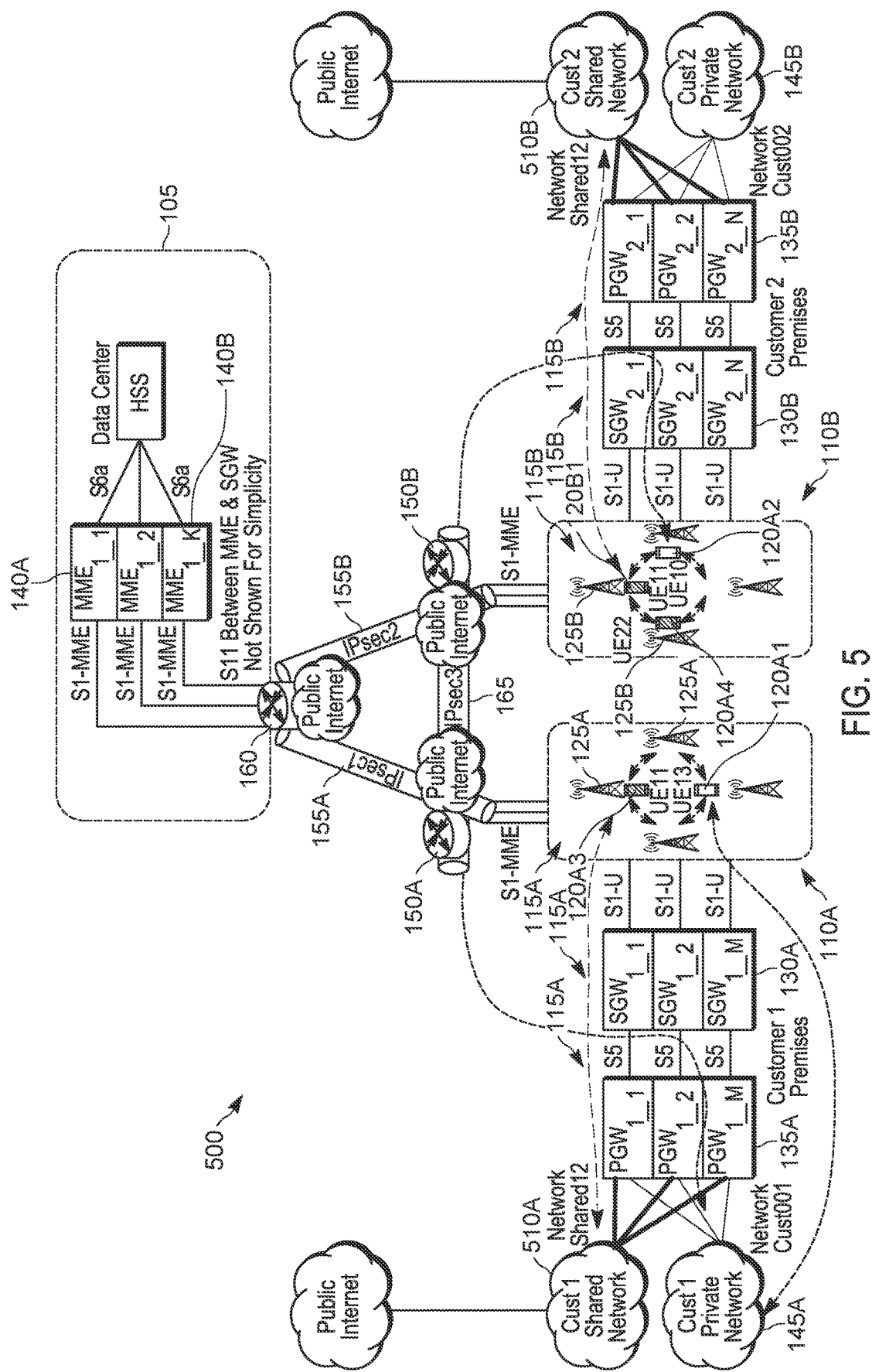
FIG. 5 is a block diagram of the multitenant private communication system of FIG. 1 illustrating a shared network in accordance with some embodiments.

FIG. 5 illustrates another example embodiment of the multitenant private communication system 500. The multitenant private communication system 500 is similar to the multitenant private communication system 100 and like numerals are used to represent similar components in both systems. The multitenant private communication system 500 additionally includes a first shared private sub-network 510A and a second shared private sub-network 510B. In some embodiments, the first shared private sub-network 510A and the second shared private sub-network 510B are part of the same network. In other embodiments, the first shared private sub-network 510A and the second shared private sub-network 510B are independent networks having shared access between the first tenant 110A and the second tenant 110B. The first shared private sub-network 510A and the second shared private sub-network 510B are collectively referred to as a shared private sub-network 510. The shared private sub-network 510 may be created based on the sharing agreement between the first tenant 110A and the second tenant 110B. The shared private sub-network 510 is private to the members of the first tenant 110A and the second tenant 110B. The multitenant private communication system 500 defines a shared APN for the shared private sub-network 510 for accessing the shared private sub-network 510 through one of the plurality of first PGWs 135A and/or one of the plurality of second PGWs 135B.

In the example illustrated in FIG. 5, the first tenant 110A includes three types of user devices 120A. A first user device 120A1 is marked as "resident only", a second user device 120A2 is marked as "travelling", and a third user device 120A3 is marked as "sharing". The first user device 120A1 can connect to the first private sub-network 145A through the first network infrastructure 115A only. That is, the first user device 120A1 is not permitted to connect to the second network infrastructure 115B. For example, when the first user device 120A1 travels to the second tenant's 110B or another tenant's 110 premises, the first user device 120A1 cannot connect to the second network infrastructure 115B or network infrastructure 115 of other tenants 110. The second user device 120A2 can connect to the first private sub-network 145A through the first network infrastructure 115A and/or through the second network infrastructure 115B. That is, the second user device 120A2 is permitted to connect to the second network infrastructure 115B. The first APN may be assigned as the default APN for the first user device 120A1 and the second user device 120A2. However, the first user device 120A1 and the second user device 120A2 may also be allowed to access the shared private sub-network 510 with a different APN. The third user device 120A3 can connect to the shared private sub-network 510 through the first network infrastructure 115A and/or the second network infrastructure 115B. In one example, a fourth user device 120A4 also marked as "sharing" is shown as having travelled to the second tenant 110B. The fourth user device 120A4 can connect to the shared private sub-network 510 through the second network infrastructure 115B. It should be noted that the third user device 120A3 and the fourth user device 120A4 connect to respective first shared private sub-network 510A and second shared private sub-network 510B based on the current location of the third user device 120A3 and the fourth user device 120A4. The shared APN may be set as the default APN for the third user device 120A3 and the fourth user device 120A4 (for example, a second plurality of user devices 120). However, the third user device 120A3 and the fourth user device 120A4 may also be allowed to access the first private sub-network 145A with a different APN. However, the first user device 120A1, the second user device 120A2, the third user device 120A3, and the fourth user device 120A4 are not allowed to access the second private sub-network 145B. The second tenant 110B may also include similar configurations for the second plurality of user devices 120B.

Figure 6:
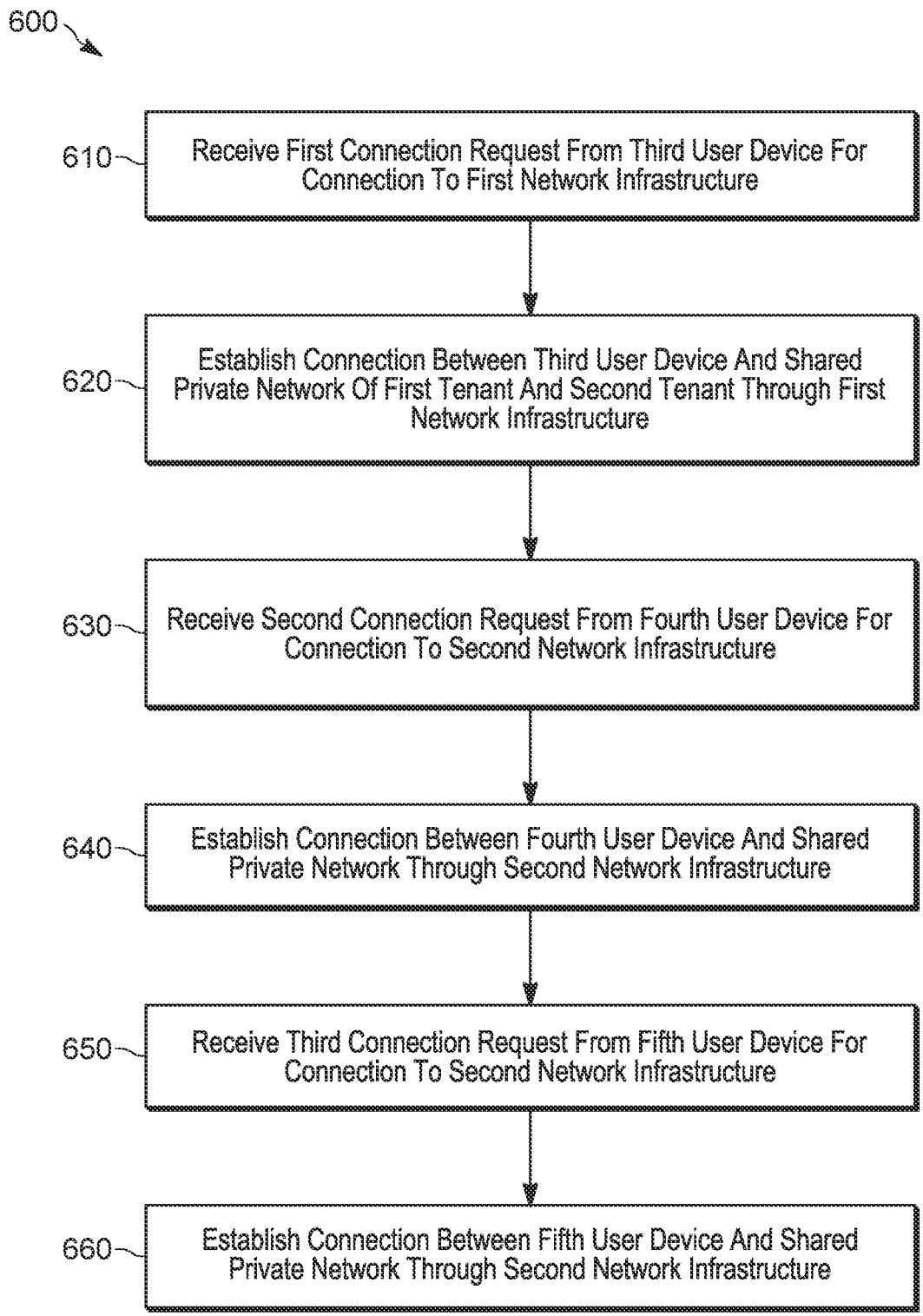
FIG. 6 is a flowchart of a method for providing mobility and access control across tenant boundaries in the multitenant private communication system of FIG. 1 in accordance with some embodiments.

FIG. 6 is a flowchart of an example method 600 for providing mobility and access control across tenant boundaries in the multitenant private communication system 500. In the example illustrated, the method 600 includes receiving a first connection request from the third user device 120A3 for connection to the first network infrastructure 115A (at block 610). The first network infrastructure 115A is the resident network infrastructure 115 of the third user device 120A3. As discussed above, the third user device 120A3 is marked as "sharing" with the shared APN set as the default APN. The method 600 includes establishing a connection between the third user device 120A3 and the shared private sub-network 510 of the first tenant 110A and the second tenant 110B through the first network infrastructure 115A (at block 620). As shown in FIG. 5, the third user device 120A3 connects to the shared private sub-network 510 through the first network infrastructure 115A.

The method 600 also includes receiving a second connection request from the fourth user device 120A4 for connection to the second network infrastructure 115B (at block 630). The first network infrastructure 115A is the resident network infrastructure 115 of the fourth user device 120A4. As shown in FIG. 5, the fourth user device 120A4 has travelled to the premises of the second tenant 110B. As discussed above, the fourth user device 120A4 is marked as "sharing" with the shared APN set as the default APN. The method 600 includes establishing a connection between the fourth user device 120A4 and the shared private sub-network 510 through the second network infrastructure 115B (at block 640). As shown in FIG. 5, the fourth user device 120A4 connects to the shared private sub-network 510 through the second network infrastructure 115B. Accordingly, the user devices 120 marked as "sharing" can connect to the shared private sub-network 510 through any of the network infrastructure 115 of the participating tenants 110.

In the example shown, after the request from the fourth user device 120A4, a third connection request from a fifth user device 120B1 (shown in FIG. 5) for connection to the second network infrastructure 115B is received (at block 650). The second network infrastructure 115B is the resident network infrastructure 115 of the fifth user device 120B1. The fifth user device 120B1 is a member of the second tenant 110B and is marked as "sharing" similar to the third user device 120A3. The shared APN is set as the default APN of the fifth user device 120B1 (for example, a third plurality of user devices 120 that are members of the second tenant 110B). The method 600 includes establishing a connection between the fifth user device 120B1 and the shared private sub-network 510 through the second network infrastructure 115B (at block 660). As shown in FIG. 5, the fifth user device 120B1 connects to the shared private sub-network 510 through the second network infrastructure 115B.

Methods disclosed herein therefore allow tenants 110 in a multitenant private communication system 100 to share network infrastructure 115 and allow user devices 120 to travel between tenant premises. User devices 120 may be configured to operate on a shared network between the tenants 110 and/or configured to have data routed to the resident network of the user device 120 when travelling to another tenant's premises. Permissions for using shared network or home routing may be configured by an administrator of each tenant 110.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A multitenant private communication system comprising:
a first tenant including a first network infrastructure, a first private sub-network, and a user device, the first network infrastructure being a resident network infrastructure of the user device and the first private sub-network being private for members of the first tenant;
a second tenant including a second network infrastructure; and
a data center communicating with the first tenant and the second tenant and including an electronic processor configured to
receive a first connection request from the user device for connection to the first network infrastructure,
establish a connection between the user device and the first private sub-network through the first network infrastructure;
receive a second connection request from the user device for connection to the second network infrastructure;
determine whether the second network infrastructure is a guest network infrastructure of the user device;
establish a connection between the user device and the first private sub-network through the second network infrastructure when the second network infrastructure is the guest network infrastructure of the user device; and
reject a connection between the user device and the second network infrastructure when the second network infrastructure is not the guest network infrastructure of the user device.

2. The system of claim 1, wherein the first tenant includes a first plurality of user devices as members of the first tenant, wherein the user device is one of the first plurality of user devices, wherein the electronic processor is further configured to
define an access point name (APN) for the first private sub-network; and
set the APN as a default APN of the first plurality of user devices.

3. The system of claim 2, wherein the user device is a first user device, the system further comprising:
a shared private sub-network private for the members of the first tenant and the second tenant,
wherein the electronic processor is further configured to
receive a third connection request from a second user device for connection to the first network infrastructure, the first network infrastructure being the resident network infrastructure of the second user device;
establish a connection between the second user device and the shared private sub-network through the first network infrastructure;
receive a fourth connection request from a third user device for connection to the second network infrastructure, the first network infrastructure being the resident network infrastructure of the third user device; and
establish a connection between the third user device and the shared private sub-network through the second network infrastructure.

4. The system of claim 3, wherein the first tenant includes a second plurality of user devices as members of the first tenant, wherein the second tenant includes a third plurality of user devices as members of the second tenant, wherein the second user device and the third user device are one of the second plurality of user devices, wherein the electronic processor is further configured to
define a shared access point name (APN) for the shared private sub-network;
set the shared APN as a default APN of the second plurality of user devices and the third plurality of user devices.

5. The system of claim 1, wherein the first network infrastructure includes one or more selected from the group consisting of a base station, a serving gateway (SGW), and a packet data network gateway (PGW) of the first tenant.

6. The system of claim 1, wherein the first tenant and the second tenant share a public land mobile network identifier (PLMNID), wherein the first tenant is assigned a first tracking area code and the second tenant is assigned a second tracking area code.

7. The system of claim 6, wherein the user device is assigned a user profile including a regional subscription zone code (RSZC), wherein the electronic processor is further configured to
store, in a memory of the data center, an access control database including a plurality of tracking area codes, each tracking area code mapped to mapped to one or more RSZCs, wherein determining that the second network infrastructure is the guest network infrastructure of the user device includes determining that the RSZC of the user profile is mapped to the second tracking area code in the access control database.

8. The system of claim 1, further comprising:
a tenant internet protocol security (IPsec) tunnel directly connecting the first network infrastructure and the second network infrastructure,
wherein, to establish the connection between the user device and the first private sub-network through the second network infrastructure, the electronic processor is configured to route traffic between the user device and the first private sub-network through the tenant IPsec tunnel.

9. A method for providing mobility and access control across tenant boundaries in a multitenant private communication system, the method comprising:
receiving a first connection request from a user device for connection to first network infrastructure of a first tenant of the multitenant private communication system, the first network infrastructure being a resident network infrastructure of the user device;
establishing a connection between the user device and a first private sub-network of the first tenant through the first network infrastructure, the first private sub-network being private for members of the first tenant;
receiving a second connection request from the user device for connection to second network infrastructure of a second tenant of the multitenant private communication system;
determining whether the second network infrastructure is a guest network infrastructure of the user device;
establishing a connection between the user device and the first private sub-network through the second network infrastructure when the second network infrastructure is the guest network infrastructure of the user device; and rejecting a connection between the user device and the second network infrastructure when the second network infrastructure is not the guest network infrastructure of the user device.

10. The method of claim 9, further comprising:

defining an access point name (APN) for the first private sub-network; and setting the APN as a default APN of a first plurality of user devices of the first tenant, wherein the user device is one of the first plurality of user devices.

11. The method of claim 10, wherein the user device is a first user device, further comprising:

receiving a third connection request from a second user device for connection to the first network infrastructure, the first network infrastructure being the resident network infrastructure of the second user device;

establishing a connection between the second user device and a shared private sub-network of the first tenant and the second tenant through the first network infrastructure;

receiving a fourth connection request from a third user device for connection to the second network infrastructure, the first network infrastructure being the resident network infrastructure of the third user device; and establishing a connection between the third user device and the shared private sub-network through the second network infrastructure.

12. The method of claim 11, further comprising:

defining a shared access point name (APN) for the shared private sub-network;

setting the shared APN as a default APN of a second plurality of user devices of the first tenant, wherein the second user device and the third user device are one of the second plurality of user devices; and setting the shared APN as a default APN of a third plurality of user devices of the second tenant.

13. The method of claim 9, wherein the first network infrastructure includes one or more of a base station, a serving gateway (SGW), and a packet data network gateway (PGW) of the first tenant.

14. The method of claim 9, wherein the first tenant and the second tenant share a public land mobile network identifier (PLMNID), wherein the first tenant is assigned a first tracking area code and the second tenant is assigned a second tracking area code.

15. The method of claim 14, further comprising:

assigning a user profile including a regional subscription zone code (RSZC) to the user device storing an access control database including a plurality of tracking area codes, each tracking area code mapped to mapped to one or more RSZCs, wherein determining that the second network infrastructure is the guest network infrastructure of the user device includes determining that the RSZC of the user profile is mapped to the second tracking area code in the access control database.

16. The method of claim 9, further comprising providing a tenant internet protocol security (IPsec) tunnel directly connecting the first network infrastructure and the second network infrastructure; and routing traffic between the user device and the first private sub-network through the tenant IPsec tunnel.

\* \* \* \* \*